US005547093A

United States Patent [19]
Sparks

[11] Patent Number: 5,547,093
[45] Date of Patent: Aug. 20, 1996

[54] METHOD FOR FORMING A MICROMACHINE MOTION SENSOR

[75] Inventor: Douglas R. Sparks, Kokomo, Ind.

[73] Assignee: Delco Electronics Corporation, Kokomo, Ind.

[21] Appl. No.: 305,540

[22] Filed: Sep. 14, 1994

[51] Int. Cl.$^6$ .................................................. B44C 1/22
[52] U.S. Cl. .............................. 216/2; 216/38; 437/233; 437/235
[58] Field of Search .................................. 216/2, 18, 52, 216/75, 100, 38; 156/644.1, 656.1, 657.1, 662.1; 437/228, 233, 235, 238, 241, 245, 901, 927, 974; 73/505

[56] References Cited

U.S. PATENT DOCUMENTS 5,447,601  9/1995  Norris ......................................... 216/2

*Primary Examiner*—William Powell
*Attorney, Agent, or Firm*—Jimmy L. Funke

[57] ABSTRACT

A method for forming a motion sensor for sensing motion or acceleration of a body, such as the type used in VCR cameras and onboard automotive and aerospace safety control system or navigational system. The motion sensor includes a sensing structure, such as a resonating metal ring and spring structure, which is supported above a substrate and circumscribed by an electrode pattern. The sensing structure is supported above the substrate by an electrically-conductive post located at the axis of motion. The electrodes serve to drive the ring into resonance, balance the sensing structure by inducing stiffness in the ring and springs, and sense rotary motion of the ring. To electrically interconnect the ring with the electrodes, three non-dielectric layers are formed on the substrate to form a radial conductor pattern, a concentric conductor pattern and a bias plane beneath the sensing structure. In accordance with this invention, one of the non-dielectric layers is a planarized doped polysilicon layer, while the remaining two non-dielectric layers are planarized and passivated metal layers. Additional accessories for enhancing the performance and reliability of the motion sensor include one or more g-stops which prevent excessive deflection, and particle getters.

13 Claims, 4 Drawing Sheets

METHOD FOR FORMING A MICROMACHINE MOTION SENSOR

This invention generally relates to motion sensors, and particularly those which sense yaw rates or acceleration through the use of a plated metal surface micromachine. More specifically, this invention relates to such a motion sensor which can be fully integrated with MOS, CMOS and BICMOS processes, and which is formed by methods which provide for improvements in performance, reliability and manufacturability, while reducing processing costs.

BACKGROUND OF THE INVENTION

Motion sensors and accelerometers are widely used in VCR cameras and aerospace and automotive safety control systems and navigational systems, such as crash sensing systems. Examples of automotive applications include anti-lock braking systems, active suspension systems, supplemental inflatable restraint systems such as air bags, and seat belt lock-up systems.

An example of a motion sensor employed in automotive systems is the yaw rate sensor, which senses movement of an automobile about a vertical axis through its center of gravity. Alternatively, an accelerometer measures acceleration, or more accurately, the force that is exerted by a body as the result of a change in the velocity of the body. Both types of sensors operate on the basis of a moving body possessing inertia which tends to resist a change in velocity.

In the past, electromechanical and electronic motion sensors have been widely used in the automotive industry to detect an automobile's deceleration. More recently, sensors which employ a plated metal surface micromachine have been developed which can be integrated with CMOS circuits on a wafer. As is known by those skilled in the art, plated metal surface micromachines are formed by a metal plating technique in cooperation with a mold which defines the shape of the micromachine on the surface of a wafer. Copending U.S. patent application Ser. No. 08/055,880 to Putty et al. discloses a novel motion sensor of this type which employs a unique resonating metal ring and spring system as a proof mass.

A yaw rate motion sensor 10 of the type taught by Putty et al. is illustrated in FIGS. 1 and 2. As shown, the sensor 10 includes a metal ring 12 which is supported by a number of arcuate springs 14 extending from a center post 16. Circumscribing the ring 12 is an electrode pattern composed of a number of individual electrodes 18. With this construction, the sensor 10 is able to detect rotary movement about the vertical axis through the center post 16 and, therefore, rotary movement about the vertical axis of the automobile. In operation, some of the electrodes 18 are energized to drive the ring 12 into resonance, others are energized to balance the resonant peaks of the rotary movement by inducing stiffness in the ring 12 and springs 14, while the remaining electrodes 18 are used to sense rotary motion of the ring 12. Accelerometers can also be fabricated based on this type of sensor construction.

FIG. 2 illustrates the construction of the sensor 10 on a silicon substrate 20. The sensor 10 primarily relies on a pair of metal layers 22 and 24 which serve as electrical interconnects for the balance and drive electrodes 18. These metal layers 22 and 24 are generally aluminum, deposited on a field oxide layer 42 to electrically isolate the layers 22 and 24 from the substrate 20, and are coated with an oxide or nitride film as an interlevel dielectric layer 26 and a passivation layer 28. Holes 30 are etched in the dielectric layer 26 to allow the metal layers 22 and 24 to be interconnected.

FIG. 3 represents the layout of the first metal layer 22, which forms a concentric conductor pattern composed of individual concentric conductors 32. FIG. 4 represents the layout of the second metal layer 24, which forms a radial conductor pattern composed of individual radial conductors 34, each of which terminate at its radially outward end with an enlarged pad 36. The radial conductors 34 electrically interconnect the concentric conductors 32 with the electrodes 18.

Also shown in FIG. 2 is a third metal layer 38, which the sensor 10 requires as an electrical interconnect for the ring 12, while also forming a bias plane 40 under the ring 12 and as a plating seed layer 44 for forming the ring 12, springs 14, post 16, and electrodes 18. This third metal layer 38 is typically a multilayer of a tungsten-silicon alloy and gold, or a titanium-tungsten alloy and gold, although it is foreseeable that other suitable materials could possibly be used, and is deposited on the passivation layer 28 so as to be directly beneath the ring 12 and springs 14.

The layout of the third metal layer 38 is shown in FIG. 5, illustrating the bias plane 40 and the plating seed layer 44. The bias plane 40 serves to prevent the ring 12 from being deflected towards or away from the substrate 20, which is critical for all capacitive and resonating micromachine devices. In that the ring 12 must be biased from about 5 to about 100 volts to induce resonance, and the substrate 20 is maintained at ground potential, the ring 12 is electrostatically attracted to the substrate 20. Therefore, the bias plane 40 is held at roughly the same potential as the ring 12, so as to prevent the ring 12 from being deflected toward the substrate 20.

The ring 12, spring 14, post 16 and electrodes 18 are then formed by first depositing and patterning a sacrificial layer (not shown) on the third metal layer 38 and the passivation layer 28. Openings are then formed through the sacrificial layer and down to the third metal layer 38 so as to form a mold for the metal micromachine structures. A plating technique is then performed to form the ring 12, spring 14, post 16 and electrodes 18 illustrated in FIGS. 1 and 2.

Sensors 10 of this type are capable of extremely precise measurements, and are therefore desirable for use in automotive applications. However, the intricate structures required to form these sensors 10 must be precisely formed in order to ensure the proper operation of the sensors 10. In particular, the concentric and radial conductors 32 and 34 must be precisely formed without metal stringers being formed between the individual conductors 32 and 34 of each layer. Stringers tend to form during the metal deposition process, and may lead to shorts between electrodes 18 and between the electrodes 18 and the bias plane 40. The tendency for stringer formation is sufficiently high to cause greatly reduced die yield for the manufacturing process. The use of the metal layer 24 to form the radial conductors 34 of the sensor 10 requires dielectric planarization of the metal layer 24, to reduce the tendency for stringer formation, which raises processing costs. As known to those skilled in the art, conventional planarizing techniques include the use of spin-on glass (SOG), etch-back or polyimide layers to form a more planar upper surface on a deposited layer, thereby eliminating notches and surface irregularities on the surface of the deposited layer.

An additional potential shortcoming of the sensor 10 is that the bias plane 40 lies directly under the electrodes 18 and ring 12, such that the tendency for shorting is significantly increased, which also may reduce process yield. Finally, the implementation of all three metal layers 22, 24 and 38 is not fully compatible with MOS, CMOS and BICMOS processes, in that additional masking levels are required to form three metal layers, resulting in higher fabrication costs.

Therefore, while the teachings of Putty et al. provide a precision motion sensor 10 which is highly suitable for automotive applications, it would be highly desirable if further reductions in manufacturing complexity and costs could be achieved. In particular, it would be desirable if such a sensor 10 could be fully integrated into MOS, CMOS and BICMOS processes to improve the efficiency of its fabrication, and thereby reduce production costs and time, while simultaneously improving production yield by reducing the tendency for electrical shorting between individual metal layers.

Therefore, it would be advantageous to provide a plated metal surface micromachine motion sensor whose construction is not only able to accurately detect motion and acceleration of a body, but also requires a minimal number of processing steps so as to facilitate its manufacture and reduce production costs, while also increasing reliability and production yields.

SUMMARY OF THE INVENTION

It is an object of the present invention to provide a cost-efficient motion sensor which is suitable for use in automotive applications and also amenable to automotive production techniques.

It is another object of this invention that such a motion sensor employ a micromachined resonating ring and spring structure which is supported above a substrate.

It is a further object of this invention that the fabrication of such a motion sensor be fully integrated with MOS, CMOS and BICMOS processes.

It is still a further object of this invention that such a fabrication process improve production yield by reducing the tendency for electrical shorting between individual metal layers within the motion sensor.

In accordance with a preferred embodiment of this invention, these and other objects and advantages are accomplished as follows.

A motion sensor is provided for sensing motion or acceleration of a body, such as an automobile for use in an onboard automotive safety control system or navigational system. The motion sensor includes a sensing structure, such as a resonating metal ring and spring structure, which is supported above a substrate and circumscribed by an electrode pattern. As such, the sensing structure defines an axis of motion for the motion sensor which is disposed approximately normal to the substrate. The sensing structure is supported above the substrate by an electrically-conductive post located at the axis of motion. The electrodes serve to drive the ring into resonance, balance the sensing structure by inducing stiffness in the ring and springs, and sense rotary motion of the ring.

To electrically interconnect the ring with the electrodes, three non-dielectric layers are formed on the substrate to form a radial conductor pattern, a concentric conductor pattern and a bias plane beneath the sensing structure. The term non-dielectric will be used throughout to include semiconductor materials and electrically conductive materials. In accordance with this invention, one of the non-dielectric layers is a planarized doped polysilicon layer, while the remaining two non-dielectric layers are planarized and passivated metal layers.

The non-dielectric layer which forms the bias plane is electrically insulated from the substrate. A central portion of the bias plane is defined at the sensing structure's axis of motion, and is electrically interconnected to the sensing structure through the post. The non-dielectric layer which forms the radial conductor pattern is also electrically insulated from the substrate. Each radial conductor of the radial conductor pattern extends approximately radially from the sensing structure's axis of motion, and has a radial distal end which is electrically connected to an electrode.

The non-dielectric layer which forms the concentric conductor pattern is also electrically insulated from the substrate. Each concentric conductor of the concentric conductor pattern is electrically interconnected with at least one of the radial conductors of the radial conductor pattern. As a result, a portion of the electrodes surrounding the ring are each electrically interconnected with at least one of the concentric conductors beneath the ring, enabling the electrodes to drive, balance and sense the sensing structure. Finally, a passivation layer overlays the non-dielectric layers so as to form a surface of the motion sensor beneath the sensing structure.

In a preferred embodiment, the non-dielectric layers which form the radial and concentric conductors are metal layers, while the non-dielectric layer which forms the bias plane is the doped polysilicon layer. Because the sensing structure and the bias plane are merely biased and are not required to accommodate current flow, the higher electrical resistance of the polysilicon bias plane does not adversely effect the performance of the sensor.

The bias plane is preferably located below the radial and concentric conductors within the sensing structure, and immediately above the substrate. To improve the electrical isolation of the bias plane, an N-well diffusion is preferably formed in the substrate beneath the bias plane.

Additional accessories for enhancing the performance and reliability of the motion sensor include one or more g-stops which prevent excessive deflection, and particle getters. At least one g-stop structure is preferably disposed adjacent the perimeter of the sensing structure and electrically interconnected with the bias plane, and serves to prevent the sensing structure from sticking to the electrodes. At least one particle getter is located in proximity to the sensing structure, and serves to electrostatically attract particles which might otherwise cause shorts if they become lodged between an electrode and the sensing structure.

The above motion sensor is particular suited for sensing structures composed of plated metal surface micromachines. Use of a plated metal surface micromachine as the sensing structure provides for a precision motion sensor which is highly suitable for automotive applications. Furthermore, the use of a doped polysilicon layer to form either the bias plane or the radial or concentric conductor patterns reduces the manufacturing complexity and cost of the sensor by reducing the number of processing steps required in the fabrication of the sensor. Use of the polysilicon layer also enables the sensor to be fully integrated into MOS, CMOS and BICMOS processes, in that the polysilicon layer for the sensor can be formed simultaneously with the gate of a MOS, CMOS or BICMOS device. The result is improved efficiency of the sensor's fabrication, and therefore reduced production costs and time.

Finally, planarizing the non-dielectric layers serves to prevent stringers from forming following etching of the various layers. In the preferred embodiment, planarizing the polysilicon layer which forms the bias plane, and the metal layer which forms the radial conductor pattern, prevents the formation of stringers during subsequent processing steps, while planarizing the metal layer which forms the concentric conductor pattern reduces any detrimental effect which the concentric conductor pattern may have on the shape of the sensing structure. As a result, production yields are significantly improved while the tendency for electrical shorting between the individual non-dielectric layers is reduced.

Other objects and advantages of this invention will be better appreciated from the detailed description thereof, which follows:

BRIEF DESCRIPTION OF THE DRAWINGS

The above and other advantages of this invention will become more apparent from the following description when taken in conjunction with the accompanying drawings, in which.

DETAILED DESCRIPTION OF THE PREFERRED EMBODIMENTS

Figure 1:
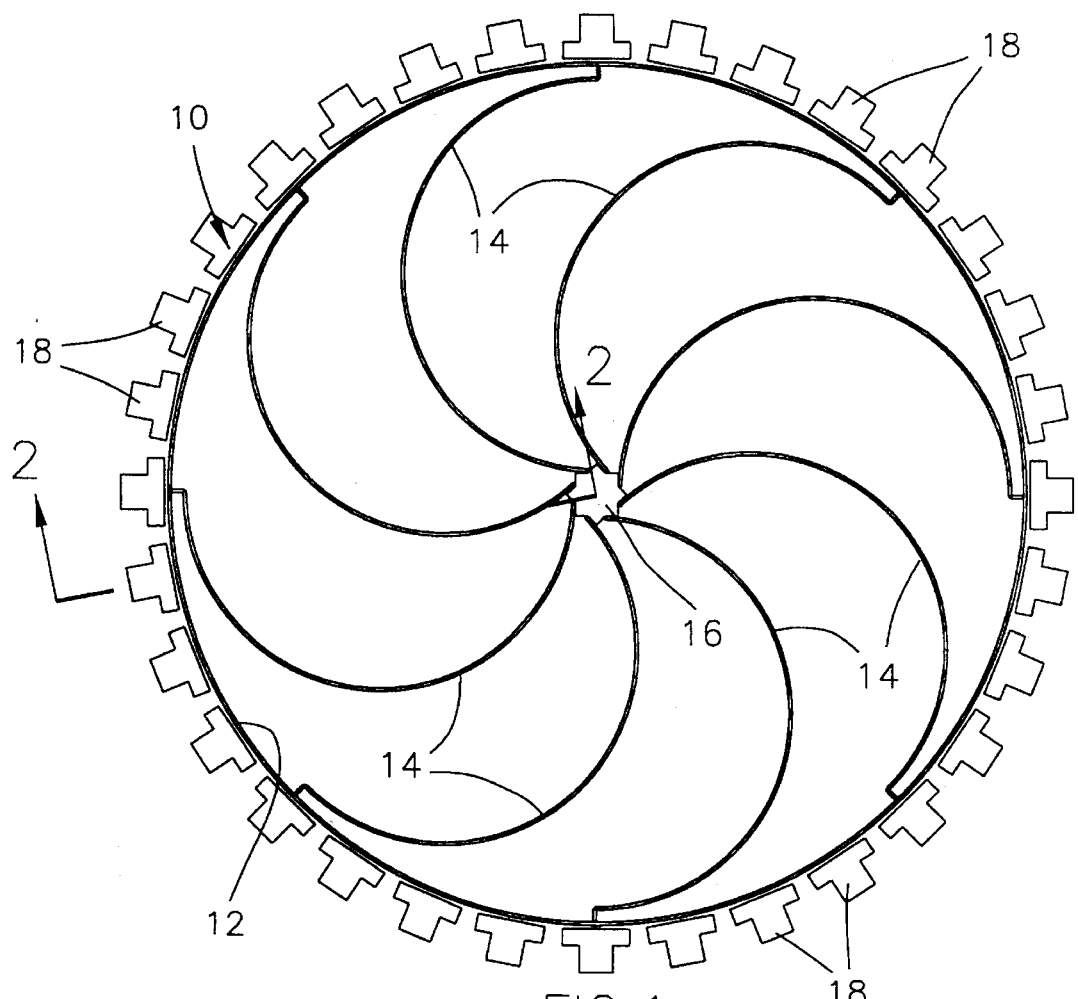
FIG. 1 is a plan view of a motion sensor of a type known in the prior art.

A motion sensor 110 in accordance with a preferred embodiment of this invention is illustrated in FIGS. 6 through 9. Because the external appearance and construction of the sensor 110 is similar to that of the type taught by U.S. patent application Ser. No. 08/055,880 to Putty et al., reference can be made to FIG. 1 for the purpose of initially describing the sensor 110 (FIG. 6), with common features in FIG. 6 being identified with the same reference numerals as used in FIG. 1.

Generally, and as discussed with reference to the Putty et al. sensor 10 of FIGS. 1 and 2, the motion sensor 110 of this invention (FIG. 6) preferably employs a unique resonating sensing structure, though other sensing structures could foreseeably be used. As shown, the motion sensor 110 includes a metal ring 12 which is supported by a number of arcuate metal springs 14, through other types of spring structures could be used. The springs 14 extend radially from a metal post 16, such that the post 16 defines the axis of motion for the ring 12. Circumscribing the ring 12 is an electrode pattern composed of a number of individual metal electrodes 18. With this construction, the motion sensor 110 is able to detect rotary movement about the vertical axis through the post 16. As a result, the motion sensor 110 is also able to detect rotary movement about the vertical axis of an automobile in which the sensor 110 is installed. In operation, some of the electrodes 18 are energized to drive the ring 12 into resonance, others are energized to balance the sensing structure by inducing stiffness in the ring 12 and springs 14, while the remaining electrodes 18 are used to sense rotary motion of the ring 12. A more detailed explanation of the operation of the motion sensor 110 can be derived from Putty et al., which is incorporated by reference.

While the present invention will be described with reference to the sensor 110 as being a yaw rate motion sensor, those skilled in the art will recognize that the same basic structure and the teachings of this invention are also applicable to accelerometers and methods for their fabrication. Furthermore, though the sensor 110 will be discussed in terms of integration with a CMOS process, those skilled in the art will recognize that the sensor 110 is equally suited for integration into MOS and BICMOS processes.

Figure 2:
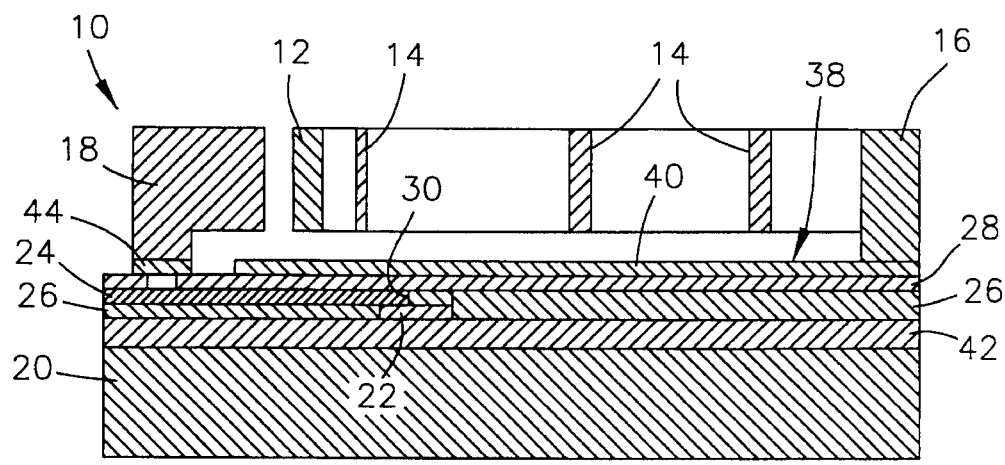
FIG. 2 is a cross-sectional view of the motion sensor of FIG. 1 in accordance with the prior art.
Figure 3:
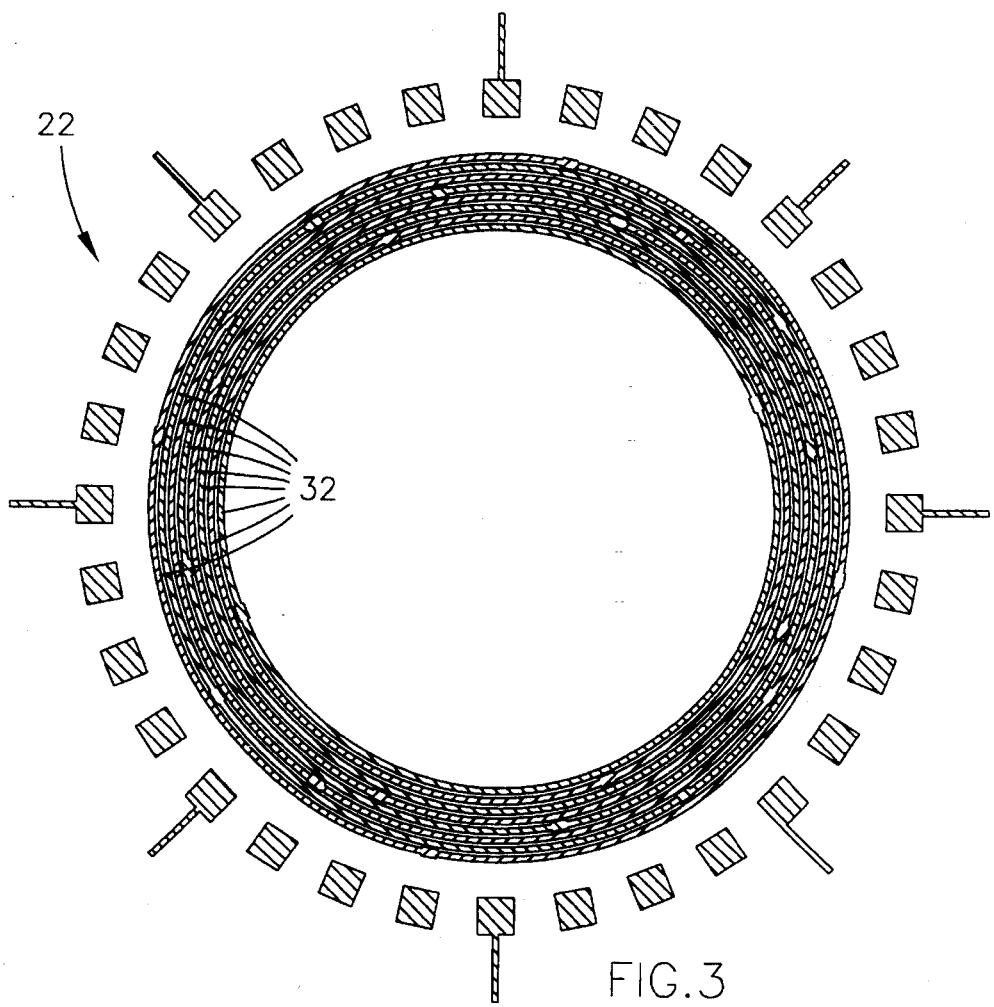
FIG. 3 is a plan view of a concentric conductor pattern employed in the motion sensor of FIGS. 1 and 2.
Figure 4:
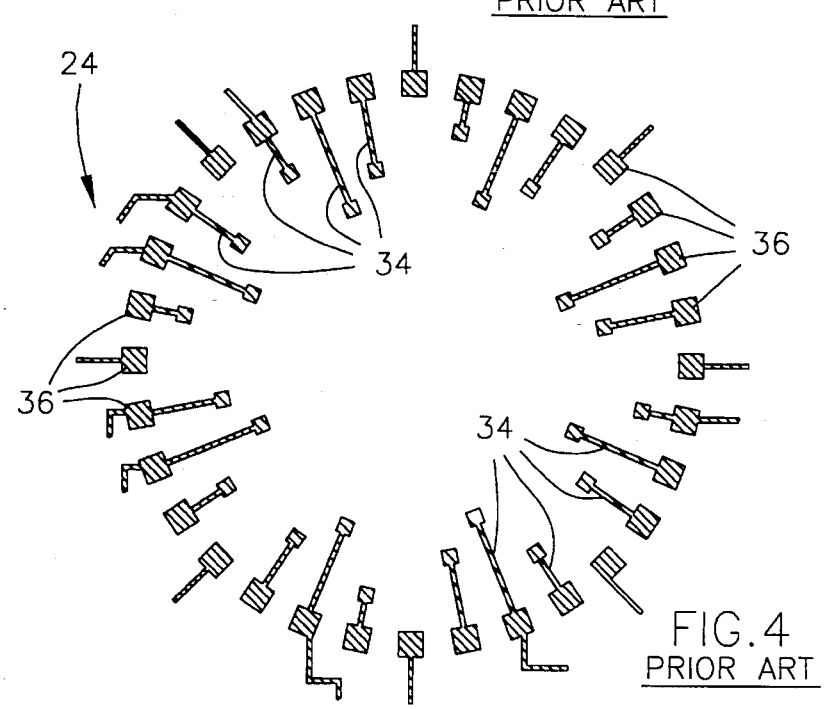
FIG. 4 is a plan view of a radial conductor pattern employed in the motion sensor of FIGS. 1 and 2.
Figure 6:
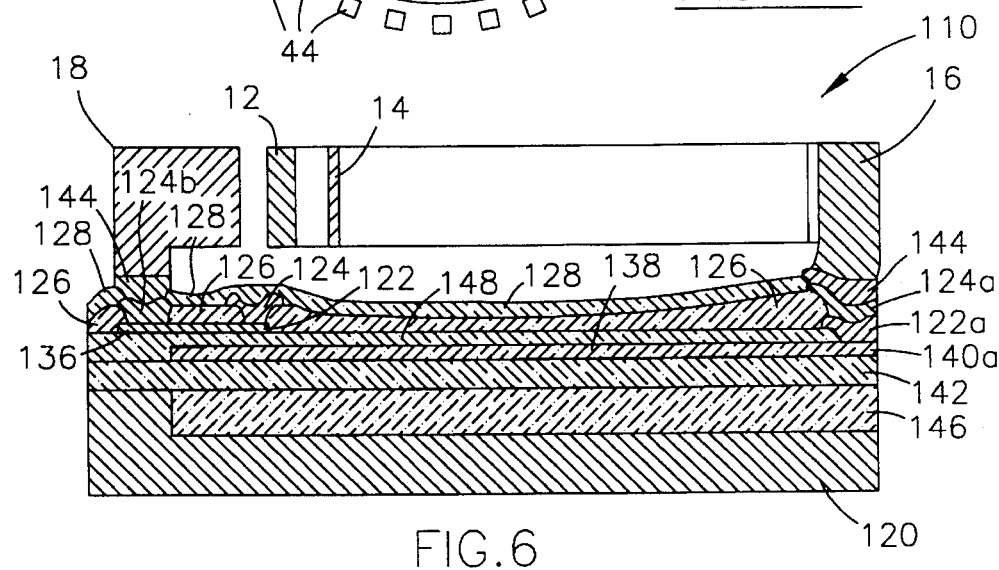
FIG. 6 is a cross-sectional view of a motion sensor of the type shown in FIG. 1, but in accordance with a preferred embodiment of this invention.

FIG. 6 distinguishes the configuration of this sensor 110 from that of the prior art shown in FIG. 2, though similarities do exist to the extent noted above. Generally, the sensor 110 of this invention is built on a silicon substrate 120 which, for purposes of integrating into a CMOS process, is conventionally a P-type silicon wafer. Operation of the sensor 110 primarily relies on a pair of metal layers 122 and 124 and a doped polysilicon layer 138. In the preferred embodiment, the metal layers 122 and 124 form a radial conductor pattern and a concentric conductor pattern, respectively, such as that shown in FIGS. 4 and 3 for the prior art sensor 10 (only one concentric conductor is shown in FIG. 6 for clarity). As such, the metal layers 122 and 124 serve as electrical interconnects for the electrodes 18 which balance and drive the ring 12.

The metal layers 122 and 124 are generally aluminum, though other suitable materials could be used, and preferably have a thickness of about 6000 to about 24,000A, though greater or lesser thicknesses could be employed. The metal layers 122 and 124 are preferably planarized to enhance the reliability of the sensor 110, as will be discussed in greater detail below. A suitable planarizing technique is a spin-on glass (SOG) process of a type known in the art.

Also in accordance with the preferred embodiment, the polysilicon layer 138 serves as the bias plane 140 for the sensor 110. The bias plane 140 is preferably centered beneath the post 16, with a central portion 140a of the bias plane 140 being located directly beneath the post 16, i.e., on the axis of motion for the ring 12. The polysilicon layer 138 preferably has a thickness of about 3000 to about 5000A, though greater or lesser thicknesses could foreseeably be used. As with the metal layers 122 and 124, the polysilicon layer 138 is also preferably planarized to enhance the reliability of the sensor 110, as will be discussed below.

Figure 5:
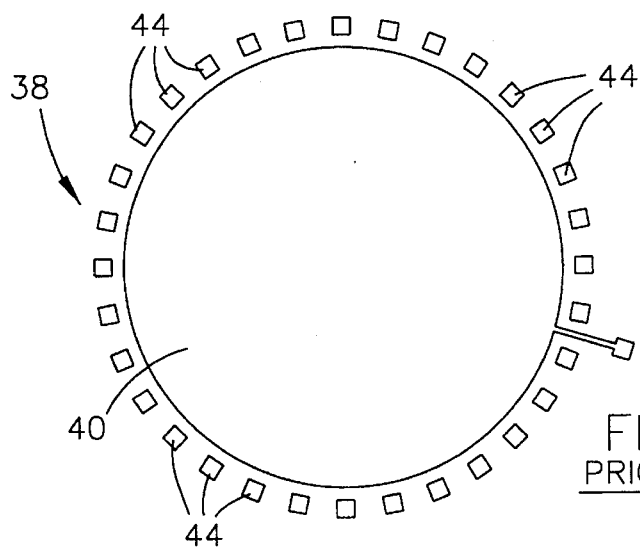
FIG. 5 is a plan view of a bias plane employed in the prior art motion sensor of FIG. 2.
Figure 7:
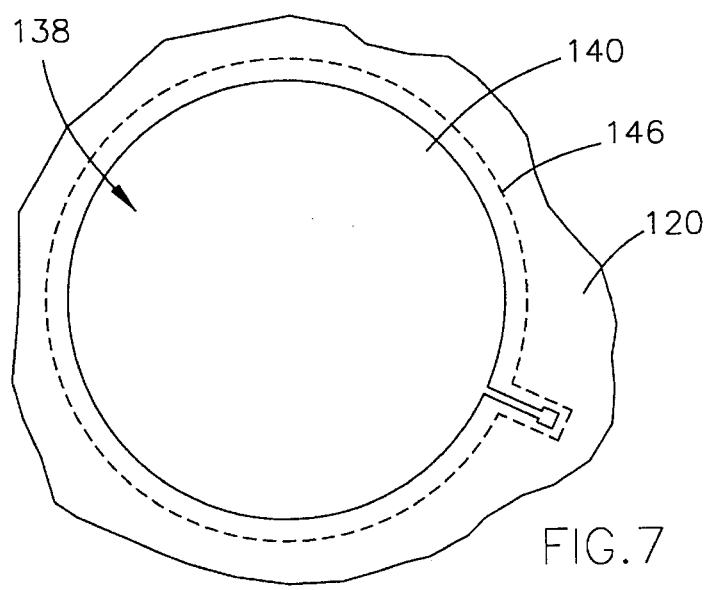
FIG. 7 is a plan view of a bias plane employed in the motion sensor of FIG. 6.

The layout of the bias plane 140 is shown in FIG. 7. As with the bias plane 40 of the prior art sensor 10 (FIG. 5), the bias plane 140 serves to prevent the ring 12 from being deflected towards or away from the substrate 120. Therefore, during operation of the sensor 110, the bias plane 140 is held at approximately the same potential as the ring 12 so as to prevent the ring 12 from being electrostatically attracted to the substrate 120. Notably, because the bias plane 140 is not required to sustain current flow, the higher electrical resistance of the doped polysilicon material does not adversely affect the performance of the sensor.

As seen in FIG. 6, the metal layers 122 and 124 and the polysilicon layer 138 are formed on a thick field oxide layer 142 to electrically isolate the layers 122, 124 and 138 from the substrate 120. A suitable thickness for this field oxide layer 142 is about 5000 to about 10,000A, though thicker or thinner field oxide layers could also foreseeably be used. To further ensure the electrical separation of the polysilicon layer 138 and the substrate 120, an N-well diffusion 146 is preferable formed in the surface of the substrate 120.

As shown in FIG. 7, the N-well diffusion 146 extends radially beyond the bias plane 140 formed by the polysilicon layer 138. As a result, a short through the field oxide region 142 to the N-well diffusion 146 will not affect the circuit performance of the sensor 110, such that reliability of the sensor 110 is enhanced. Notably, if the sensor 110 is to be integrated with a BICMOS process, the N-well diffusion 146 can be junction isolated as well.

A dielectric layer, preferably a Low Temperature Oxide (LTO) layer 148 having a thickness of about 8000A, covers the polysilicon layer 138, in order to electrically isolate the bias plane 140 from the radial and concentric conductors formed by the metal layers 122 and 124. As with the metal and polysilicon layers 122, 124 and 138, the LTO layer 148 is also preferably planarized by a spin-on glass technique.

As shown in FIG. 6, the central portion 140a of the bias plane 140 is not covered by the LTO layer 148, so as to allow the bias plane 140 to be electrically interconnected to the post 16 through metal layers 122a and 124a and a plating seed layer 144. These metal layers 122a and 124a are preferably formed simultaneously with the radial and concentric conductors formed by the first and second metal layers 122 and 124, as will be described below. An interlevel dielectric layer 126, a passivation layer 128, the plating seed layer 144, and the sensing structure described above complete the sensor 110.

Figure 8:
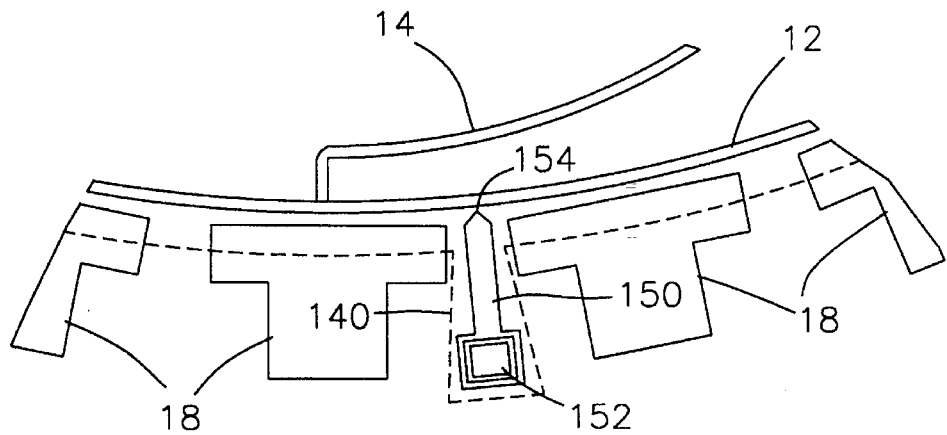
FIG. 8 is a plan view of a g-stop structure for the motion sensor of FIG. 6.
Figure 9:
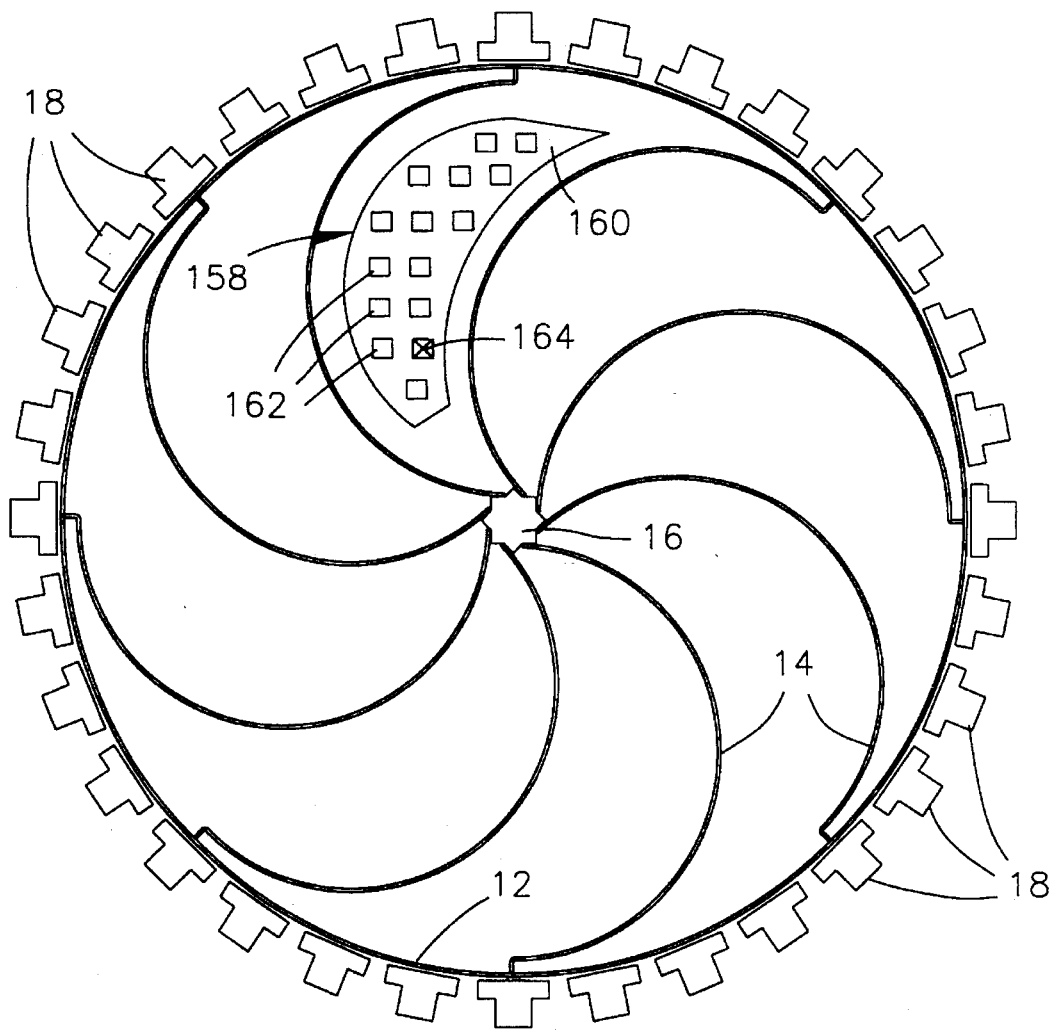
FIG. 9 is a plan view of a particle getter for the motion sensor of FIG. 6.

Additional and preferred components of the sensor 110 are shown in FIGS. 8 and 9. FIG. 8 illustrates a metal g-stop 150 located between a pair of adjacent electrodes 18 and having a surface 154 facing the ring 12. The g-stop 150 is preferably formed during the metal plating process in which the ring 12, springs 14, post 16 and electrodes 18 are formed. As shown, the surface 154 forms a point, though any feature having a suitably small surface area could foreseeably be used.

The g-stop 150 prevents the ring 12 from sticking to the electrodes 18 due to excessive lateral motion. The surface 154 of the g-stop 150 is located closer to the ring 12 than are the electrodes 18. The g-stop 150 is electrically interconnected to the bias plane 140 through a contact 152, which is preferably formed by metal layers deposited simultaneously with the metal layers 122 and 124. As a result, the g-stop 150 is held at approximately the same potential as both the bias plane 140 and the ring 12 so as to prevent the ring 12 from becoming electrostatically held by, and therefore irreparably shorted to, one of the electrodes 18 adjacent the g-stop 150 following fabrication of the sensor 110, or in the event of the sensor 110 being subjected to an acceleration sufficiently high to deflect the ring 12 toward one of the electrodes 18 adjacent the g-stop 150. Though a single g-stop 150 is shown, a number of g-stops 150 are preferably formed between adjacent pairs of electrodes 18.

FIG. 9 illustrates a particle getter 158 located between a pair of adjacent springs 14 on the surface of the sensor 110. As shown, the particle getter 158 is composed of an unpassivated metal layer 160 formed on the passivation layer 128, and a number of micromachine blocks 162 formed on the surface of the metal layer 160. The blocks 162 are preferably formed during the metal plating process in which the ring 12, springs 14, post 16 and electrodes 18 are formed, while a metal interconnect 164 between the metal layer 160 and the bias plane 140 is preferably formed by metal layers deposited simultaneously with the metal layers 122 and 124. As a result, the particle getter 158 is held at approximately the same potential as both the bias plane 140 and the ring 12, such that particles and debris will be electrostatically attracted to the particle getter 158, instead of becoming lodged between the ring 12 and the electrodes 18. Though shown as being formed on the surface of the sensor 110, the particle getter 158 can be located anywhere in proximity to the sensor 110 and still perform its function well. Furthermore, the blocks 162 could be formed to have shapes other than that shown, in that maximized surface area provided by the blocks 162 is important for maximizing the efficiency of the particle getter 158, and not the shape of the blocks 16.

Though a single particle getter 158 is shown, a number of particle getters 158 are preferably employed. To increase the proficiency of the particle getters 158, they can be biased at a voltage which is higher than that of the ring 12 and bias plane 140 by appropriately providing an electrical interconnect between the particle getters 158 and a suitable voltage source.

As an alternative to the structure described above, the sensor 110 could be modified to employ the polysilicon layer 138 to form the radial conductor pattern, and use the metal layers 122 and 124 to form either the bias plane 140 or the concentric conductor pattern. Because each of the layers 122, 124 and 138 are passivated and planarized, shorting between the electrodes 18 and the bias plane 140 is prevented. However, if the metal layer 124 is used as the bias plane 140, a large step generated by the metal layer 124 could distort the shape of the ring 12 and the electrodes 18, leading to balancing problems. Therefore, a bias plane 140 formed by the metal layer 124 should not extend beneath the ring 12 or the electrodes 18, but preferably should be inset radially inward from the ring 12 about five micrometers.

A preferred method by which the sensor 110 of this invention is fabricated is described below. Though the preferred method will be described in reference to fabricating the sensor 110 within a CMOS process, those skilled in the art will readily recognize that the method of this invention can also be extended to other processes, including MOS processes generally and BICMOS processes.

The preferred method begins with the creation of the N-well diffusion 146 within the substrate 120, which is preferably a lightly-doped p-type substrate. The substrate 120 is doped with a suitable dopant, such as the ions of boron or another trivalent element, so as to have a suitable acceptor concentration, as is well known in the art. The substrate 120 represents a portion of a monocrystalline silicon wafer which is made sufficiently thick so as to permit handling, while the lateral dimensions of the wafer are generally large enough such that the wafer may be subsequently diced into a number of chips.

The N-well diffusion 146 can be formed using various suitable techniques known to those skilled in the art, such as by donor-implanting the substrate 120 with the ions of arsenic, phosphorous, antimony or another pentavalent element. Preferably, the N-well diffusion 146 is formed to be sufficiently wide such that it will radially extend about 10 micrometers beyond the perimeter of the bias plane 140. The depth of the N-well diffusion 146 is preferably on the order of about 2 micrometers. The field oxide layer 142 is then thermally formed on the surface of the substrate 120 in a conventional manner. During this step, conventional field masking, implantation and oxidation techniques can be employed to form the gate oxide for the CMOS devices formed on the substrate 120.

The polysilicon layer 138 for the bias plane 140 can then be deposited, doped and patterned using methods known to those skilled in the art. As noted above, a preferred thickness for the bias plane 140 is about 3000 to about 5000A. When integrated in a CMOS process, deposition of the polysilicon layer 138 also involves forming resistors and the gate for the CMOS device or devices.

If integrated in a BICMOS process, the emitters of the bipolar transistors are formed during deposition of the polysilicon layer 138. Preferably, the polysilicon layer 138 is effectively planarized by planarizing the LTO layer 148 several times using a spin-on glass technique. Due to the thinness of the polysilicon layer 138 and the beneficial effect of being planarized, the bias plane 140 is unlikely to cause shorts in the sensor 110, even if the bias plane 140 extends beneath the electrodes 18.

After the polysilicon process, the N+ and P+ source and drain are formed for the CMOS devices on the substrate 120. The LTO layer 148 is then deposited and planarized, and contacts are cut into the LTO layer 148 and the gate oxide of the CMOS devices to allow for formation of resistors and the devices, as well as to expose the central portion 140a of the bias plane 140 to allow the bias plane 140 to be electrically interconnected with the post 16. The metal layers 122 and 122a are then simultaneously deposited, masked and etched using conventional techniques known to those skilled in the art. As noted above, the metal layer 122 forms the radial conductor pattern while the metal layer 122a forms an interconnect between the bias plane 140 and the post 16. The radially distal ends 136 of the radial conductors extend beneath the electrodes 18, as shown in FIG. 6. The metal layer 122 is planarized primarily to prevent stringers from forming after etching the second metal layer 124 between adjacent CMOS circuits, as well as to prevent stringer shorts between electrodes 18 and between the electrodes 18 and the bias plane 140 or ring 12.

The interlevel dielectric 126, which is for example a plasma oxide/spin-on glass combination, a nitride or a polyimide, is then formed over the radial conductor pattern formed by the first metal layer 122. The interlevel dielectric 126 is also planarized so as to improve the step coverage of the first metal layer 122. A number of concentric vias are then etched into the interlevel dielectric 126 in order to form the concentric conductor pattern with the second metal layer 124. In addition, vias are also formed in the interlevel dielectric layer 126 so as to expose the distal ends 136 of the radial conductors, on which metal pads 124b are formed.

The metal layers 124 and 124a and the pads 124b are then simultaneously deposited, masked and etched using conventional techniques known to those skilled in the art. Preferably, the metal layer 124 is also planarized in order to reduce the impact which the metal layer 124 may have on the shape and balance of the sensing structure to be subsequently formed.

As can be seen from FIG. 6, the individual concentric conductors formed by the second metal layer 124 are electrically interconnected to the electrodes 18 through the radial conductors formed by the metal layer 122 and through the metal pads 124b. In accordance with this invention, even if sidewall stringers were to form along the concentric conductors formed by the metal layer 124, as will often be the case due to processing limitations, such stringers will not short out any of the electrodes 18 because in that the stringers would follow the concentric pattern of the concentric conductors.

Finally, the passivation layer 128 is formed by a conventional deposition, mask and etch process. As can be seen in FIG. 6, the passivation layer 128 serves as the upper surface of the sensor 110 beneath the ring 12 in order to provide electrically shielding therebetween. Vias in the passivation layer 128 are then opened to expose the metal layers 124 and 124a and the pads 124b. The plating seed layers 144 are then deposited on the metal layers 124 and 124a, and then masked and etched. In addition, the unpassivated metal layer 160 for the particle getter 158 is formed on the passivation layer 128.

Sacrificial layers (not shown) are then deposited on the passivation layer 128, the unpassivated metal layer 160 and the plating seed layer 144 to form the cavity beneath the sensing structure. As is known in the art, suitable materials for the sacrificial layers include polyimide, aluminum and photoresist, as well as others. A mold (not shown) for forming the sensing structure and the electrodes is then deposited and patterned on the sacrificial layers using conventional methods. For example, the mold can be formed from photoresist using lithography and/or reactive ion etching. Thereafter, a metal plating technique is employed to form the ring 12, springs 13, post 16 and electrodes 18, which, after removal of the mold and sacrificial layers, results in the sensing structure shown in FIGS. 1 and 6. The g-stops 150 and the blocks 162 of the particle getters 158 are also formed during the metal plating process. The plating metal can be nickel, a nickel-phosphorus alloy, copper, gold, silver, iron, cobalt or any other suitable metal or alloy.

In view of the above, it can be appreciated that the sensor 110 of this invention has significant advantages over the sensor 10 of the prior art. For example, the use of the doped polysilicon layer 138 to form either the bias plane 140 or the radial or concentric conductor patterns reduces the manufacturing complexity and cost of the sensor 110 by reducing the number of processing steps required in the fabrication of the sensor. For example, the third metal layer 38 required by the sensor 10 of FIG. 2 is completely eliminated, resulting in the elimination of a masking level, which reduces fabrication costs and increases production yield.

In addition, use of the polysilicon layer 138 also enables the sensor 110 of this invention to be fully integrated into MOS, CMOS and BICMOS processes, in that the polysilicon layer 138 can be formed simultaneously with the gate of a MOS, CMOS or BICMOS device. The result is improved efficiency of the sensor's fabrication, and therefore reduced production costs and time.

Finally, planarizing the metal layers 122 and 124 and the polysilicon layer 138 serves to prevent stringers from forming during the fabrication of the sensor 110. In the preferred embodiment, planarizing the polysilicon layer 138 which forms the bias plane 140 and the metal layer 122 which forms the radial conductor pattern prevents the formation of stringers during subsequent processing steps, while planarizing the metal layer 124 which forms the concentric conductor pattern reduces any detrimental effect which the concentric conductor pattern may have on the shape of the ring 12 and electrodes 18. As a result, production yields are significantly improved while the tendency for electrical shorting between the individual layers is reduced.

The sensor 110 of the present invention also incorporates the advantages of the prior art sensor 10, in that use of a plated metal surface micromachine to form the ring 12, springs 14, post 16 and electrodes 18 of the sensor provides for a precision motion sensor 110 which is highly suitable for automotive applications.

While our invention has been described in terms of a preferred embodiment, it is apparent that other forms of the device could be adopted by one skilled in the art. For example, the teachings of this invention could be used with modified or alternative materials, or with modified processing parameters. Furthermore, those skilled in the art will appreciate that the sensor of this invention and its method for fabrication is equally applicable to accelerometers and possibly other motion sensing devices. Accordingly, the scope of our invention is to be limited only by the following claims.

The embodiments of this invention in which an exclusive property or privilege is claimed are defined as follows:

1. A method for forming a motion sensor having a sensing structure which is circumscribed by an electrode pattern and supported above a substrate so as to define an axis of the motion sensor, the method comprising the steps of:

providing a substrate formed by a wafer on which MOS circuits are formed;

forming at least three non-dielectric layers on the substrate, wherein:
 a first of the at least three non-dielectric layers is formed as a bias plane for the motion sensor, the bias plane being formed so as to be electrically insulated from the substrate and such that a central portion of the bias plane is defined at the axis;
 a second of the at least three non-dielectric layers is formed so as to define a radial conductor pattern which is electrically insulated from the substrate and the bias plane, and such that each radial conductor of the radial conductor pattern extends approximately radially from the axis and terminates with a radial distal end;
 a third of the at least three non-dielectric layers is formed so as to define a concentric conductor pattern which is electrically insulated from the substrate, and such that each concentric conductor of the concentric conductor pattern is electrically interconnected with at least one of the radial conductors of the radial conductor pattern; and
 one of the at least three non-dielectric layers is a planarized doped polysilicon layer and two of the at least three non-dielectric layers are planarized and passivated metal layers;

forming a passivation layer over the at least three non-dielectric layers, such that the passivation layer forms a surface of the motion sensor;

forming a post along the axis such that the post is electrically interconnected to the bias plane;

forming the sensing structure such that the sensing structure is supported by the post over the surface of the motion sensor and is electrically interconnected to the bias plane through the post; and forming the electrode pattern which circumscribes the sensing structure such that the electrode pattern is electrically interconnected to each radial distal end of the radial conductor pattern.

2. A method as recited in claim 1 further comprising the step of forming an N-well diffusion in the substrate and below the bias plane.

3. A method as recited in claim 1 wherein the method is incorporated within a MOS, CMOS or BICMOS process.

4. A method as recited in claim 1 wherein the planarized doped polysilicon layer is formed simultaneously with the gate of a MOS, CMOS or BICMOS process.

5. A method as recited in claim 1 further comprising the steps of doping the substrate so as to form a source and drain of a MOS, CMOS or BICMOS process.

6. A method as recited in claim 1 wherein the radial conductor pattern and the concentric conductor pattern are formed by the metal layers, and wherein the bias plane is formed by the polysilicon layer.

7. A method as recited in claim 1 further comprising the step of forming a g-stop structure adjacent a perimeter of the sensing structure so as to prevent sticking of the sensing structure due to lateral motion thereof, such that the g-stop structure is electrically interconnected with the bias plane.

8. A method as recited in claim 1 further comprising the step of forming a particle getter at the surface of the motion sensor adjacent the sensing structure.

9. A method for forming a motion sensor having a sensing structure which is circumscribed by an electrode pattern and supported above a substrate so as to define an axis of motion of the sensing structure, the method being incorporated within a MOS, CMOS or BICMOS process and comprising the steps of:

providing a substrate formed by a wafer on which MOS circuits are to be formed;

forming a first dielectric layer on the substrate;

depositing, doping and patterning a polysilicon layer on a portion of the dielectric layer so as to form a bias plane for the motion sensor and a gate of a MOS, CMOS or BICMOS process, the axis of motion being defined within a central portion of the bias plane;

doping the substrate so as to form a source and drain of a MOS, CMOS or BICMOS process;

depositing a second dielectric layer over the bias plane;

forming a via in the second dielectric layer so as to expose the central portion of the bias plane;

depositing a first metal layer on the second dielectric layer and in the via in the second dielectric layer, the first metal layer defining a radial conductor pattern on the second dielectric layer, each radial conductor of the radial conductor pattern extending approximately radially from the axis of motion and having a radial distal end, the first metal layer deposited in the via forming a base portion of a post that will be subsequently formed to support the sensing structure above the substrate;

depositing a third dielectric layer over the first metal layer and the second dielectric layer;

etching the third dielectric layer so as to define concentric vias through the third dielectric layer which expose concentric portions of the first metal layer, and so as to expose the base portion of the post;

depositing a second metal layer in the concentric vias and on the base portion of the post so as to form a concentric conductor pattern and an intermediate portion of the post, respectively, each concentric conductor of the concentric conductor pattern being electrically interconnected with at least one of the radial conductors of the radial conductor pattern, an outer concentric conductor of the concentric conductor pattern being deposited over the radial distal ends of the radial conductors;

forming a passivation layer over the third dielectric layer, the passivation layer forming a surface of the motion sensor beneath the sensing structure;

etching the passivation layer so as to expose the second metal layer; and depositing metal so as to form the post on the intermediate portion of the post, the sensing structure supported by the post over the substrate, and the electrode pattern which circumscribes the sensing structure, such that the sensing structure is electrically interconnected to the bias plane through the post and the base and intermediate portions of the post, and such that the electrodes of the electrode pattern are electrically interconnected to the radial conductor pattern through the second metal layer deposited over the radial distal ends of the radial conductors.

10. A method as recited in claim 9 further comprising the steps of planarizing the polysilicon layer, the second and third dielectric layers, and the second metal layer using a spin-on glass technique.

11. A method as recited in claim 9 further comprising the step of forming an N-well diffusion in the substrate and below the bias plane.

12. A method as recited in claim 9 further comprising the step of forming a g-stop structure adjacent a perimeter of the sensing structure so as to prevent sticking of the sensing structure due to lateral motion thereof, such that the g-stop structure is electrically interconnected with the bias plane.

13. A method as recited in claim 9 further comprising the step of forming a particle getter at the surface of the motion sensor adjacent the sensing structure.

* * * * *